United States Patent [19]

Okazaki

[11] Patent Number: 5,321,673
[45] Date of Patent: Jun. 14, 1994

[54] PARTIAL ROM TYPE OPTICAL DISK AND ITS RECORDING AND REPRODUCING APPARATUS

[75] Inventor: Yukinori Okazaki, Hirakata, Japan

[73] Assignee: Matsushita Electric Industrial Co., Ltd., Osaka, Japan

[21] Appl. No.: 864,675

[22] Filed: Apr. 7, 1992

[30] Foreign Application Priority Data

Apr. 12, 1991 [JP] Japan .................. 3-079554

[51] Int. Cl.$^5$ .................. G11B 7/007
[52] U.S. Cl. .................. 369/13; 369/275.2
[58] Field of Search .................. 269/13, 14, 15, 32, 269/275.2, 275.3

[56] References Cited

U.S. PATENT DOCUMENTS 5,150,339  9/1992  Ueda et al. .................. 369/275.2 X

FOREIGN PATENT DOCUMENTS

| 0232134 | 8/1987 | European Pat. Off. . |
| 56-156936 | 12/1981 | Japan .................. 369/275.2 |
| 59-165254 | 9/1984 | Japan .................. 369/275.2 |
| 61-5442 | 1/1986 | Japan . |
| 61-280048 | 12/1986 | Japan . |
| 62-137744 | 6/1987 | Japan . |
| 62-192943 | 8/1987 | Japan . |
| 63-29338 | 2/1988 | Japan . |
| 63-48677 | 3/1988 | Japan . |
| 63-167474 | 7/1988 | Japan . |
| 63-217569 | 9/1988 | Japan . |
| 63-234426 | 9/1988 | Japan . |
| 63-291227 | 11/1988 | Japan . |
| 1-16225 | 6/1989 | Japan . |
| 2-246031 | 10/1990 | Japan .................. 369/13 |
| 3-19148 | 1/1991 | Japan . |

OTHER PUBLICATIONS

K. Meissner, "CD-ROM: Device, system integration and standardization", *Philips Telecommunication and Data Systems Review*, vol. 44, No. 3, pp. 18-81 (Dec. 1986).

"File Access Method Which is File System Independent", *IBM Technical Disclosure Bulletin*, vol. 33, No. 1A, pp. 322-323 (Jun., 1990).

*Primary Examiner*—Tony M. Argenbright
*Attorney, Agent, or Firm*—Ratner & Prestia

[57] ABSTRACT

An optical disk provided with a ROM area for reproduction only, in which information for reproduction only and first retrieval information for retrieving the information for reproduction only are recorded in embossed shape and a rewritable area in which information can be additionally recoded or rewritten, wherein on the basis of each of a plurality of additionally recording and rewriting logical specifications of respective appliances utilizing the optical disk, the first retrieval information is converted into second retrieval information, wherein the second retrieval information corresponds to at least one of the appliances and is recorded in the rewritable area together with third retrieval information for the additionally recordable and rewritable information so as to be additionally recordable or rewritable, and an apparatus for recording and reproducing the optical disk.

3 Claims, 4 Drawing Sheets

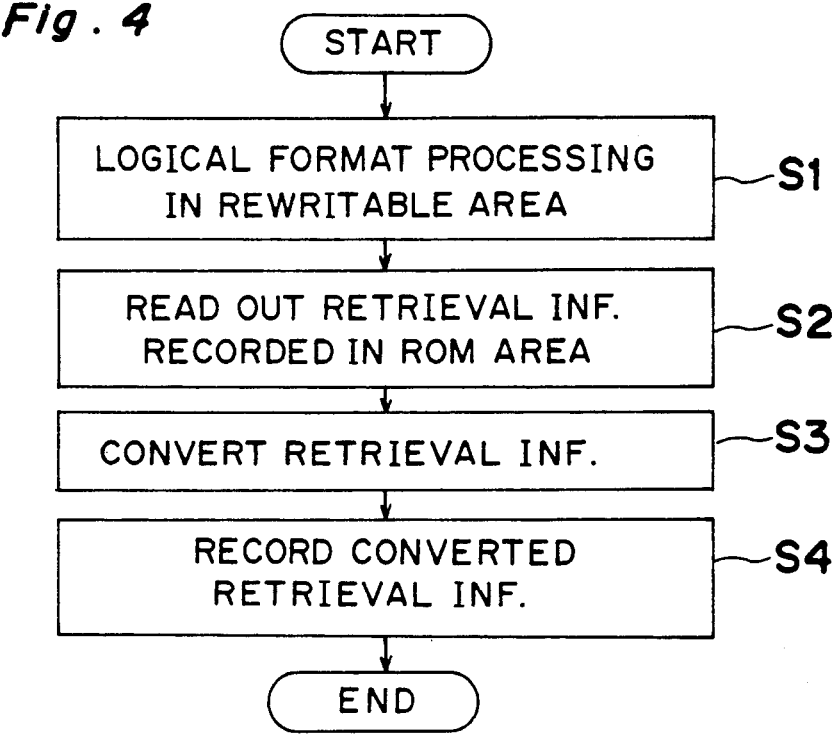
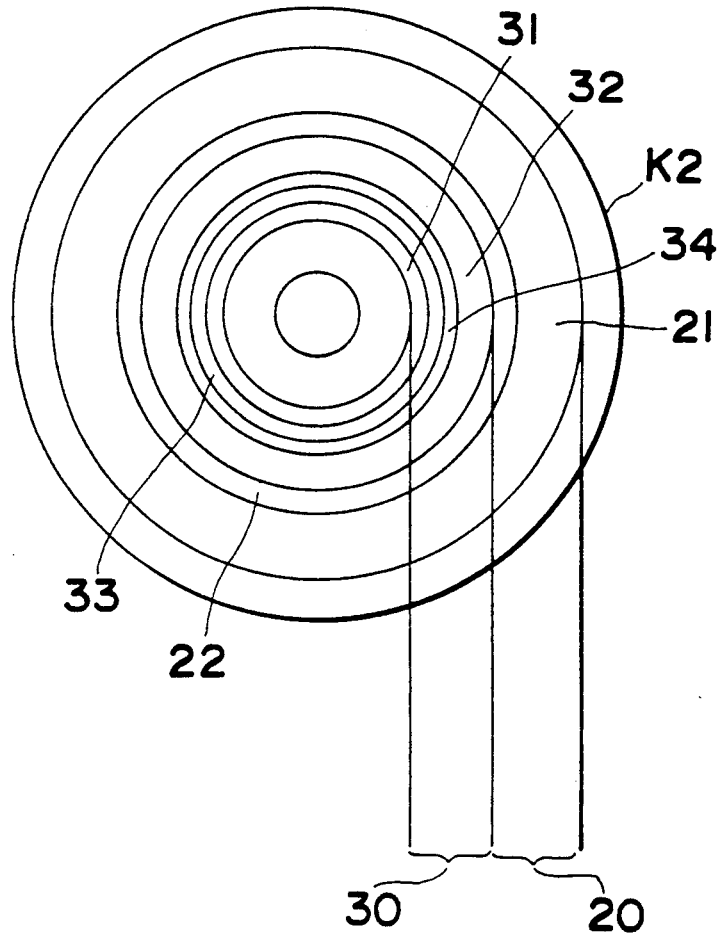

PARTIAL ROM TYPE OPTICAL DISK AND ITS RECORDING AND REPRODUCING APPARATUS

BACKGROUND OF THE INVENTION

The present invention relates to a partial ROM (read-only memory) type optical disk having not only an area for reproduction only in which information is recorded in embossed shape but an area in which information can be rewritten and an optical disk apparatus employing the optical disk, for example, an apparatus for recording and reproducing the optical disk.

In recent years, optical disks are being used as information recording mediums of large capacity. Conventionally, the optical disks have been roughly classified into a type in which information is only reproduced, e.g., a CD-ROM and a type in which information can be additionally recorded or rewritten, e.g., a magnetooptical disk.

However, recently, as indicated in Standardization Specification of ISO CD10090 for a 3.5-inch optical disk for recording digital data, a partial ROM type optical disk provided with both an area for only reproducing information (hereinbelow, referred to as a "ROM area") and an area in which information can be additionally recorded or rewritten (hereinbelow, referred to as a "rewritable area") is proposed. This optical disk includes both a first section in which information is recorded in embossed shape as in the CD-ROM and a second section in which an optical recording film for additionally recording information and guide tracks for additionally recording information are provided. Thus, the first section can be copied in a large quantity of data by stamping as in the CD-ROM, so that a large quantity of programs or data can be widely distributed at low cost.

Furthermore, when a user using the optical disk records additionally his own specific information in the rewritable area, the distributed programs can be customized for the user in setting operational conditions of the programs. Meanwhile, when the user adds his own specific data to the distributed data, the data in use can be updated or extended. As a result, a single optical disk can be used not only as a mere medium for distributing information but as a recording medium whose applications can be expanded variously.

At present, information recording rules for such partial ROM type optical disk having the ROM area and the rewritable area have not yet been determined concretely. Contents and positions of information of a known optical disk are described with reference to FIGS. 1a and 1b by reciting a CD-ROM 1 as an example. FIG. 1a shows contents and positions of information on the CD-ROM 1. As shown in FIG. 1b, all the information on the CD-ROM 1 is recorded by embossed pits 4. The CD-ROM 1 has only a ROM area for reproduction only. Thus, retrieval information 3 for retrieving recorded information such as data or programs 2 is also recorded in embossed shape in the same manner as the data or programs 2.

However, in the case where the partial ROM type optical disk having the ROM area and the rewritable area, in which a large quantity of information has been recorded in the ROM area to fully gain features of optical disks, is widely distributed at low cost, it is desirable that the optical disk can be used in a number of different computers or its applied appliances in common. To this end, information for retrieving information recorded in the ROM area should be capable of being used in the different computers or applied appliances.

In a known optical disk having the ROM area only, for example, a CD-ROM, since information for retrieving information in the ROM area is also recorded in embossed shape by stamping, a method of logically recording the retrieval information (referred to as a "logical specification", hereinbelow) is also fixed. Thus, in the case of the CD-ROM, the retrieval information can be read out under only such a logical specification as described in ISO 9660 referred to as a "CD-ROM specification". Therefore, conventionally, if the same optical disk is used in the different computers or applied appliances employing different logical specifications, the retrieval information is converted on the basis of the logical specification employed in the computer or the applied appliance in use each time and then, is used. In this case, when information in the ROM area is used, a special program for converting the retrieval information is required to be prepared and thus, the information in the ROM area cannot be handled in the same manner as other data used in the computer or the applied appliance in use. As a result, such problems arise that a long period is required for using the information in the ROM area and conversion of the logical specification is necessary. Actually, in the known optical disk having the ROM area only, even when an identical application program or an identical data base is used, a plurality of optical disks are required to be separately prepared for the different computers and its applied appliances in use, respectively.

SUMMARY OF THE INVENTION

Accordingly, an essential object of the present invention is to provide, with a view to eliminating the above inconveniences of conventional optical disks and optical disk apparatuses employing the optical disks, a partial ROM type optical disk having a ROM area for reproduction only, in which information is recorded in embossed shape and a rewritable area in which information can be additionally recorded or rewritten such that information in the ROM area can be used under different logical specifications or in different computers in common, and an optical disk apparatus employing the optical disk.

In order to accomplish this object of the present invention, an optical disk according to the present invention is provided with a ROM area for reproduction only, in which information for reproduction only and first retrieval information for retrieving the information for reproduction only are recorded in embossed shape and a rewritable area in which information can be additionally recoded or rewritten, wherein on the basis of each of a plurality of additionally recording and rewriting logical specifications of respective appliances utilizing the optical disk, the first retrieval information is converted into second retrieval information, wherein the second retrieval information corresponds to at least one of the appliances and is recorded in the rewritable area together with third retrieval information for the additionally recordable and rewritable information so as to be additionally recordable or rewritable.

By the above described arrangement of the present invention, the retrieval information recorded in embossed shape in the ROM area is converted in a format conforming to the logical specification used in a computer or its applied appliance employing the optical disk and is recorded in the rewritable area so as to be additionally recordable or rewritable.

Thus, in accordance with the present invention, the optical disk containing completely identical data or programs can be used under different logical specifications, in different computers or in different applied appliances.

Meanwhile, supposing that an optical disk is used under a logical specification or in a computer model, the same optical disk can be used under a plurality of logical specifications or in a plurality of computer models by additionally recording in the optical disk another retrieval information for using the optical disk under another logical specification or in another computer model.

BRIEF DESCRIPTION OF THE DRAWINGS

This object and features of the present invention will become apparent from the following description taken in conjunction with the preferred embodiments thereof with reference to the accompanying drawings, in which:

FIG. 4 is a flow chart showing sequences of initialization of the optical disk of FIG. 2 by the use of the apparatus of FIG. 3; and FIG. 5 is a schematic view showing layout of information areas in a partial ROM type optical disk according to a second embodiment of the present invention.

Before the description of the present invention proceeds, it is to be noted that like parts are designated by like reference numerals throughout several views of the accompanying drawings.

DETAILED DESCRIPTION OF THE INVENTION

Figure 1A:
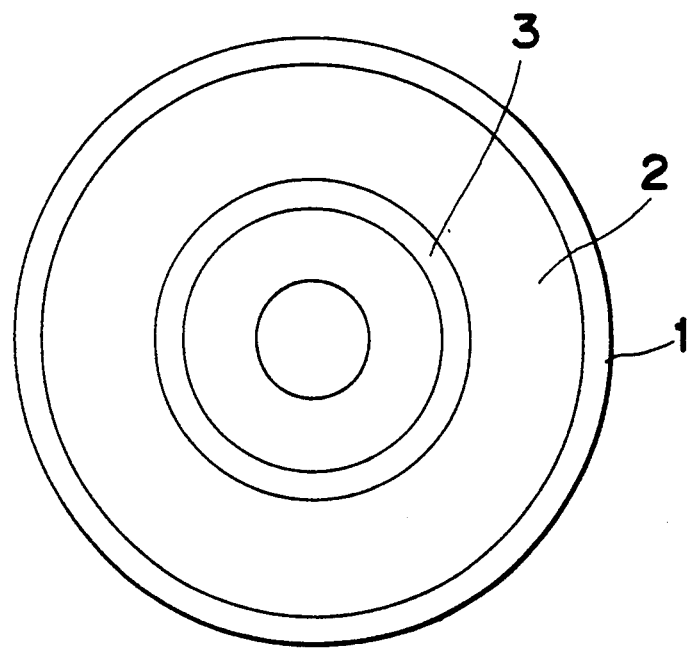
FIG. 1a is a schematic view showing layout of information areas in a prior art optical disk (already referred to)
Figure 1B:
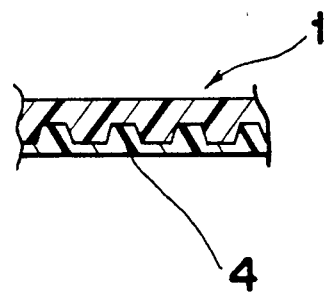
FIG. 1b is a fragmentary sectional view of the prior art optical disk of FIG. 1a (already referred to)
Figure 2:
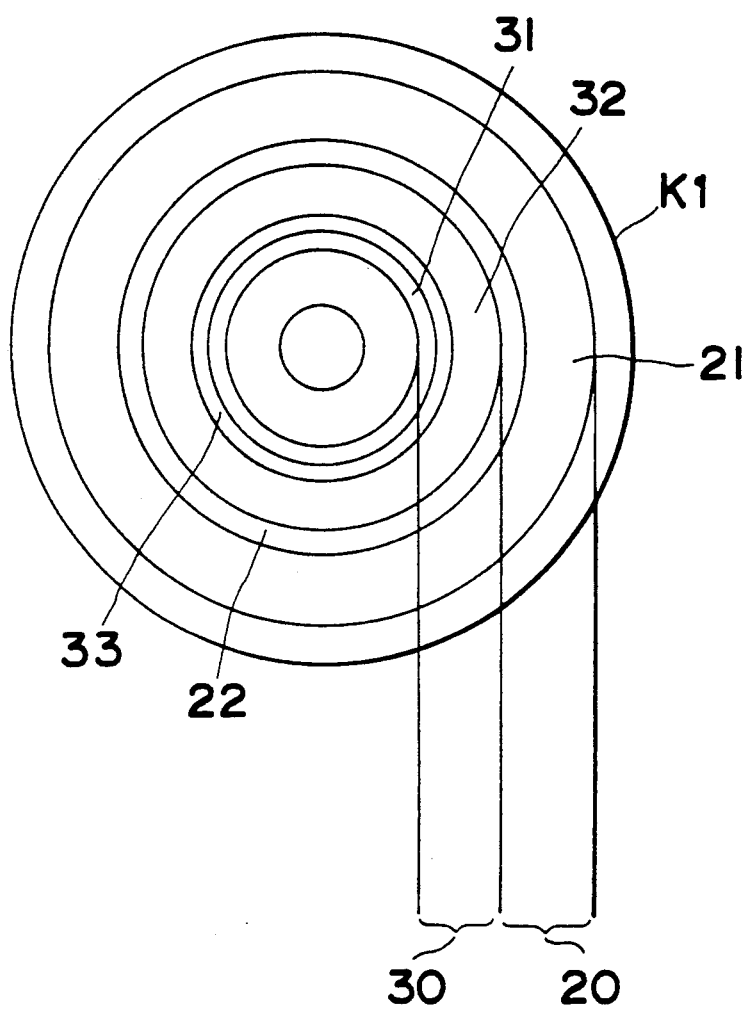
FIG. 2 is a schematic view showing layout of information areas in a partial ROM type optical disk according to a first embodiment of the present invention.

Referring now to the drawings, there is shown in FIG. 2, layout of information areas in a partial ROM type optical disk K1 according to a first embodiment of the present invention. The optical disk K1 includes a ROM area 20 for reproduction only, in which information is recorded in embossed shape and a rewritable area 30 in which information can be additionally recorded or rewritten. In the rewritable area 30, an optical information recording film such as a magnetooptical recording film, a phase change type optical recording film, etc. is formed on the tracks which are formed for guiding a beam spot for recording information. The ROM area 20 is further constituted by an information recording area 21 for recording information formed by programs, data or the like and a first retrieval information area 22 for retrieving the information of the information recording area 21.

On the other hand, the additional recordable and rewritable area 30 is constituted by a second retrieval information area 31 in which contents of the first retrieval information area 22 are read out and contents substantially identical with those of the first retrieval information area 22 are recorded on the basis of a logical specification in use so as to be additionally recordable or rewritable, an information recording area 32 in which information is added by a user and a third retrieval information area 33 for retrieving the information added by the user in the information recording area 32.

Figure 3:
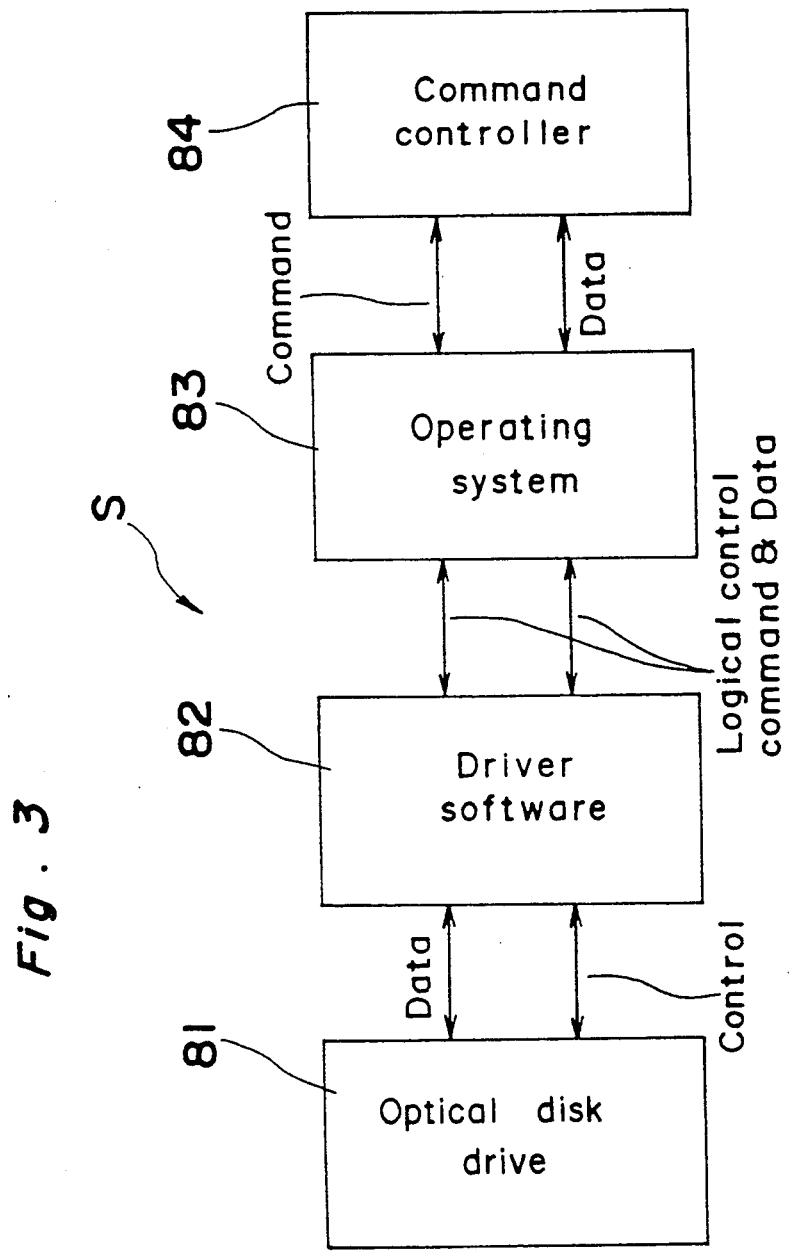
FIG. 3 is a block diagram showing construction of an apparatus for recording and reproducing the optical disk of FIG. 2, according to one embodiment of the present invention.

FIG. 3 shows construction of an apparatus S for recording and reproducing the optical disk K1, according to one embodiment of the present invention. The apparatus S is constituted by an optical disk drive 81 for driving the optical disk K1, a driver software 82 for physically controlling the optical disk drive 81, an operating system (OS) 83 for logically controlling recording or read-out of information on the optical disk K1 on the basis of a specific logical specification and a command controller 84 which interprets commands from user software, application software or an input-output device so as to cause the OS 83 to execute operation. In FIG. 3, at the time of recording of the information, the OS 83 determines layout of information areas and data format on the optical disk K1 on the basis of the specific logical specification and converts into the data format conforming to the logical specification, logical recording positions of data on the optical disk K1 and information to be recorded on the optical disk K1 so as to transmit such converted data to the driver software 82. Meanwhile, at the time of reproduction of the information, the OS 83 interprets data obtained from the optical disk K1 via the driver software 82 and converts the data into actually required data such that information read out from the optical disk K1 can be utilized in the user software or the application software. The driver software 82 interprets logical commands from the OS 83 and obtains actual recording positions of data to be recorded on or reproduced from the optical disk K1 so as to issue to the optical disk drive 81 a command for recording and reproducing information. The optical disk drive 81 acts as an information recording and reproducing device for reading out information from the optical disk K1 or recording information on the optical disk K1.

Hereinbelow, operation of the optical disk K1 and the apparatus S according to the present invention is described with reference to FIG. 4. FIG. 4 shows initialization of retrieval information based on a logical specification in use. This initialization is performed in the apparatus S when the optical disk K1 is produced. In the case where the optical disk K1 is used initially under a logical specification by employing the optical disk K1 and the apparatus S of the present invention, retrieval information for the data of reproduction only, which is recorded in the first retrieval information area 22 of the ROM area 20, is initially read out and data format of the retrieval information is converted on the basis of the logical specification in use or a specification of an applied appliance in use. Then, the converted retrieval information is recorded, as retrieval information in actual use, in the second retrieval information area 31.

By the above described processing, both the first retrieval information area 22 for retrieving information in the information recording area 21 for reproduction only in the ROM area 20 and the second retrieval information area 31 recorded as additional recording and rewriting information on the basis of the logical specification in use are provided on an information recording surface of the optical disk K1.

The retrieval information recorded in the first retrieval information area 22 of the ROM area 20 indicates mainly contents and positions of the information recorded in the information recording area 21. On the basis of the specific logical specification, a position of each information in the information recording area 21 is indicated by a physical track position or sector position or is expressed by a relative data position in the ROM area 20 or the information recording area 21, etc. The retrieval information of the first retrieval information area 22 indicates the position of each information of the information recording area 21 accurately but is written under the specific logical specification. Therefore, generally, the retrieval information of the first retrieval information area 22 does not necessarily satisfy a logical specification and retrieval procedures of a computer in actual use. Accordingly, in order to cause the retrieval information of the first retrieval information area 22 to conform to the logical specification or the computer model in use, the optical disk K1 should be subjected to initialization by using the apparatus S.

For initialization of the optical disk K1, only the rewritable area 30 is initially subjected to logical format processing at step S1. Subsequently, the retrieval information recorded in the first retrieval information area 22 of the ROM area 20 are read out at step S2. Then, at step S3, the retrieval information in the first retrieval information area 22 for reproduction only, which is expressed by the physical track positions, the physical sector positions or the relative data positions of the optical disk K1, is converted into retrieval information expressed by logical positions used on the optical disk K1 under the logical specification or the computer specification in use. Thereafter, at step S4, the converted retrieval information is recorded in the second retrieval information area 31 of the rewritable area 30 so as to be additionally recordable or rewritable.

Furthermore, a partial ROM type optical disk K2 according to a second embodiment of the present invention is described with reference to FIG. 5. In the optical disk K2, two kinds of retrieval information is recorded, as retrieval information for the ROM area 20, in the rewritable area 30 in two kinds of data formats based on different logical specifications. The optical disk K2 has the ROM area 20 and the rewritable area 30 in the same manner as the optical disk K1. In addition to the information recording area 32 and the third retrieval information area 33, the rewritable area 30 includes the second retrieval information area 31 in which contents of the first retrieval information area 22 are read out and are recorded under a first logical specification in use so as to be additionally recordable or rewritable and a fourth retrieval information area 34 in which contents of the first retrieval information area 22 are read out and are recorded under a second logical specification in use so as to be additionally recordable or rewritable. Since other constructions of the optical disk K2 are the same as those of the optical disk K1, description thereof is abbreviated for the sake of brevity.

In the second embodiment, even when an identical optical disk is used under different logical specifications, logical initialization referred to above is performed for the optical disk under the two logical specifications. As a result, the optical disk K2 is obtained and thus, the identical optical disk K2 can be used under a plurality of the logical specifications. At this time, if the position of the fourth retrieval information area 34 based on the second logical specification is so set as to deviate from that of the second retrieval information area 31 based on the first logical specification as shown in FIG. 5, information inputted to the same optical disk K2 can be used in common in computers based on a plurality of logical specifications.

Meanwhile, in the second embodiment, the second or fourth retrieval information area 31 or 34 for reproduction only is provided separately from the third retrieval information area 33 for additionally recordable and rewritable information but may also be combined with the third retrieval information area 33 into one retrieval information area.

As is clear from the foregoing description, the optical disk of the present invention is provided with the ROM area for reproduction only, in which information for reproduction only and retrieval information for retrieving the information for reproduction only are recorded in embossed shape and the rewritable area in which information can be additionally recorded or rewritten. Thus, the retrieval information for reproduction only recorded in embossed shape is converted on the basis of a logical specification for additional recording and rewriting in an appliance utilizing the optical disk and is recorded in at least one location in the rewritable area.

Therefore, in accordance with the present invention, an identical optical disk can be used under a plurality of logical specifications.

What is claimed is:

1. An optical disk provided with
   a ROM area for reproduction only, in which information for reproduction only and first retrieval information for retrieving the information for reproduction only are recorded in embossed shape, and
   a rewritable area, in which information can be additionally recorded or rewritten,
   wherein the first retrieval information is converted into second information having a logical format compatible with an appliance using the optical disk and being recorded in the rewritable area.

2. The optical disk of claim 1, wherein third retrieval information for retrieving the second information is recorded in the rewritable area.

3. An apparatus for recording and reproducing an optical disk, comprising:
   an optical disk drive for driving the optical disk; and
   a controller for controlling the optical disk drive;
   the optical disk being provided with a ROM area for reproduction only, in which information for reproduction only and retrieval information for retrieving the information for reproduction only are recorded in embossed shape and a rewritable area in which information can be additionally recorded or rewritten,
   wherein the retrieval information in the ROM area is recorded by the optical disk drive in the rewritable area on the basis of a logical specification for using the optical disk so as to be additionally recordable or rewritable.

* * * * *